(12) United States Patent
Jahn (10) Patent No.: US 8,919,779 B2
(45) Date of Patent: Dec. 30, 2014

(54) AIR-RIDING SEAL

(71) Applicant: Rolls-Royce PLC, London (GB)

(72) Inventor: Ingo Henry Johannes Jahn, West End (AU)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 14/081,564

(22) Filed: Nov. 15, 2013

(65) Prior Publication Data

US 2014/0159317 A1 Jun. 12, 2014

(30) Foreign Application Priority Data

Dec. 6, 2012 (GB) .................................. 1221932.5

(51) Int. Cl.
*F16J 15/00* (2006.01)
*F16J 15/34* (2006.01)

(52) U.S. Cl.
CPC .......... *F16J 15/3476* (2013.01); *F16J 15/3468* (2013.01)
USPC ........................................ 277/348; 277/350

(58) Field of Classification Search
USPC .................................. 277/345, 347, 348, 350
See application file for complete search history.

(56) References Cited

U.S. PATENT DOCUMENTS

| | | | |
|---|---|---|---|
| 5,039,113 A * | 8/1991 | Gardner ........................ | 277/379 |
| 6,224,060 B1 * | 5/2001 | Parker et al. .................. | 277/365 |
| 6,347,800 B1 * | 2/2002 | Auber ........................... | 277/347 |
| 6,494,458 B2 * | 12/2002 | Uth ............................... | 277/358 |
| 2010/0201074 A1 | 8/2010 | Haynes et al. | |
| 2010/0213674 A1 | 8/2010 | Garrison et al. | |

FOREIGN PATENT DOCUMENTS

| | | |
|---|---|---|
| EP | 0 086 561 A1 | 8/1983 |
| EP | 0 403 676 A1 | 12/1990 |
| EP | 0 591 586 A1 | 4/1994 |
| EP | 1 213 516 A1 | 6/2002 |
| EP | 1 577 591 A1 | 9/2005 |
| JP | A-10-47494 | 2/1998 |
| JP | A-2000-352467 | 12/2000 |
| WO | WO 2009/077027 A1 | 6/2009 |

OTHER PUBLICATIONS

Search Report issued in British Patent Application No. GB1221932.5 dated Apr. 5, 2013.
Search Report issued in European Application No. 13193021 dated Mar. 27, 2014.

* cited by examiner

*Primary Examiner* — Gilbert Lee
(74) *Attorney, Agent, or Firm* — Oliff PLC

(57) ABSTRACT

There is disclosed a rotary air-riding seal between a first structure and an adjacent second structure, including: first and second seal members defining respective seal surfaces facing to one another. The first seal member is provided on the first structure and the second seal member is mounted to the second structure towards the first seal member. At least one of said seal members is configured to generate a riding film of air between said seal surfaces. One of said seal members is supported for axial oscillation relative to the other seal member by a secondary support arrangement configured to bias said seal member towards the other seal member. The said secondary support arrangement accommodates relatively high frequency axial movements between the seal members.

9 Claims, 7 Drawing Sheets

AIR-RIDING SEAL

FIELD OF THE INVENTION

The present invention relates to an air-riding seal. More particularly, the invention relates an air-riding seal suitable for use between a first structure and an adjacent second structure, at least one of which is rotatable relative to the other.

BACKGROUND OF THE INVENTION

Fluid seals of many different types have been proposed previously for use between adjacent structures arranged for relative movement; for example between a static component and a rotating component in order to seal a fluid leakage path defined therebetween and interconnecting two fluid chambers at different pressures, whilst also accommodating relative axial movement between the adjacent structures. One area of engineering in which fluid seals of this general type are important is that of gas turbine engines.

For example, carbon seals can be found in many gas turbine engines, and indeed are often used for sealing oil within bearing chambers and gearboxes. In a typical carbon seal of this type, a carbon sealing ring is mounted for axial sliding movement relative to a stator element, and an adjacent rotor element is arranged in close contact with the carbon ring. The carbon ring is thus positioned between opposing seal faces of the stator and rotor in a manner permitting axial movements between the seal faces. Carbon seals of this type rely on a positive pressure differential to load the carbon ring so that they maintain the sealing relationship with the rotor face. This loading must be carefully controlled to ensure a small contact force to minimise frictional heat generation and seal wear. Nevertheless, simple carbon seals of this type normally require oil cooling because contact between the carbon ring and the rotor seal face generates considerable heat.

Air-riding carbon seals have also been proposed previously which are designed to operate with minimal or no oil lubrication or cooling. These effectively represent a modified form of the type of carbon seal mentioned above, and have small scallops or other convenient formations formed on the seal face of the rotor. The scallops/formations produce a cushion of air during rotation of the rotor which is effective to lift the carbon sealing ring off the rotor seal face so that it rides on the cushion of air. The air cushion which is formed is sufficient to maintain the resulting gap between the rotor seal face and the carbon ring under conditions where the rotor and carbon ring are pushed towards one another.

A problem associated with the types of carbon seals and air-riding carbon seals described above, arises from the difficulty of forming the rotor seal face so as to be perfectly flat. Any surface imperfections on the rotor seal face effectively form high points, and these impart an oscillating motion to the carbon sealing ring as the rotor rotates at high speed. The carbon sealing ring can thus be caused to lift and drop once per revolution of the rotor, with an amplitude equal to the height of the high point above the rotor seal face. Depending upon the rotational speed of the rotor, and the respective stiffness of the springs which are typically used to push the carbon sealing ring against the seal face, this can lead to significant vibrations and can even result in failure of the seal through cracking of the carbon ring.

In the particular ease of air-riding carbon seals, the inertia force which must be overcome in order to lift the carbon ring at high rotor speeds can be very significant. The resulting high contact forces acting between the carbon ring and the rotor can lead to increased wear of the carbon sealing ring, and possibly even break-up of the ring. It has therefore been proposed previously to minimise this problem by prescribing very close tolerances to the rotor seal surface, or to increase the spring force pushing the carbon ring against the rotor. As will be appreciated, manufacturing to very tight tolerances can become expensive, and increasing the spring force in this manner leads to increased rubbing wear.

It is an object of the present invention to provide an improved air-riding seal. Preferably the air-riding seal is intended to be suitable for use in a gas turbine engine. However, it is to be appreciated that the invention is not restricted to use in gas turbine engines, and indeed many other uses are possible. According to the present invention, there is provided a rotary air-riding seal between a first structure and an adjacent second structure, at least one of said structures being rotatable relative to the other about an axis of rotation, the seal comprising: first and second seal members defining respective seal surfaces in facing relation to one another, the first seal member being provided on the first structure; and the second seal member being mounted to the second structure by a primary support arrangement configured to permit axial oscillation of the second seal member and to resiliently bias the second seal member towards the first seal member, wherein at least one of said seal being characterised in that one of said seal members is supported for axial oscillation relative to the other seal member by a secondary support arrangement configured to bias said seal member towards said other seal member, wherein said support arrangements are configured such that: said primary support arrangement accommodates relatively low frequency axial movements between said seal members; and said secondary support arrangement accommodates relatively high frequency axial movements between said seal members. The arrangement is configured such that the riding film of air generated between the seal surfaces is sufficient to overcome the biasing force and any pressure forces acting on the seal members.

Preferably the second structure is provided in the form of a stator and is thus arranged to as to remain substantially stationary whilst the first structure, taking the form of a rotor, rotates relative thereto. Alternatively, the first structure may be provided in the form of a stator and the second structure provided in the form of a rotor arranged to rotate relative to the first structure. However, in alternative arrangements it is envisaged that the first and second structures may both be arranged for rotation about said axis, independently of one another. In such an arrangement the two structures can either be arranged for co-rotation or counter-rotation. In preferred embodiments, the primary support arrangement is configured to bias the second seal member towards the first seal member with a primary biasing force, and the secondary support arrangement is configured to bias one of said seal members towards the other seal member with a secondary biasing force, the secondary biasing force being less than the primary biasing force.

Said support arrangements may each comprise or form part of a mass-spring system.

In an embodiment of the invention, the first seal member is formed as an integral part of said first structure so as to be substantially immovable in an axial direction, and the second seal member is mounted to said second structure by both said primary and secondary support arrangements.

In such an arrangement, said primary support arrangement preferably comprises a thrust member intermediate said second seal member and said second structure, the thrust member being mounted to the second structure in a manner effective to permit axial oscillation of the thrust member and to resiliently bias the thrust member towards the first seal member, and wherein the second seal member is mounted to said thrust member by said secondary support arrangement to permit axial oscillation of the second seal member relative to said thrust member and said first seal member.

Preferably, said second member has a mass which is less than the mass of said thrust member.

Conveniently, the thrust member is spring-mounted to the second structure.

The second seal member is optionally spring-mounted to the thrust member.

The second seal member may be elastically mounted to the thrust member.

Preferably the seal further comprises a layer of elastically deformable material interconnecting the second seal member and the thrust member.

Advantageously, the first seal member is formed of softer material (optionally carbon) than the second seal member.

The second seal member is optionally provided in the form of a deformable sheet of metal.

Conveniently, the thrust member is mounted for movement relative to the second structure over a range which is greater than the range over which the second seal member is arranged to yield and/or over a range which is greater than the range of axial movements that are predicted to occur between the first and second structures.

In an alternative embodiment, the first seal member is mounted to said first structure by said secondary support arrangement for axial oscillation relative to said first structure and said second seal member.

Preferably, the first seal member has a mass which is less than the mass of the second seal member.

Conveniently, the second seal member is spring-mounted to the second structure.

The first seal member is optionally spring-mounted to the first structure.

The first seal member may be elastically mounted to the first structure.

Preferably, the seal further comprises a layer of elastically deformable material interconnecting the first seal member and the first structure.

Conveniently the seal further comprises at least one damper between the second seal member and the second structure.

Advantageously, the second seal member is formed from softer material (optionally carbon) than the first seal member.

The first seal member is optionally provided in the form of a deformable sheet of metal.

Conveniently, the second seal member is mounted for movement relative to the second structure over a range which is greater than the range over which the first member is arranged to yield and/or over a range which is greater than the range of axial movements that are predicted to occur between the first and second structures.

BRIEF DESCRIPTION OF DRAWINGS

So that the invention may be more readily understood, and so that further features thereof may be appreciated, embodiments of the invention will now be described by way of example with reference to the accompanying drawings in which.

Figure 1:
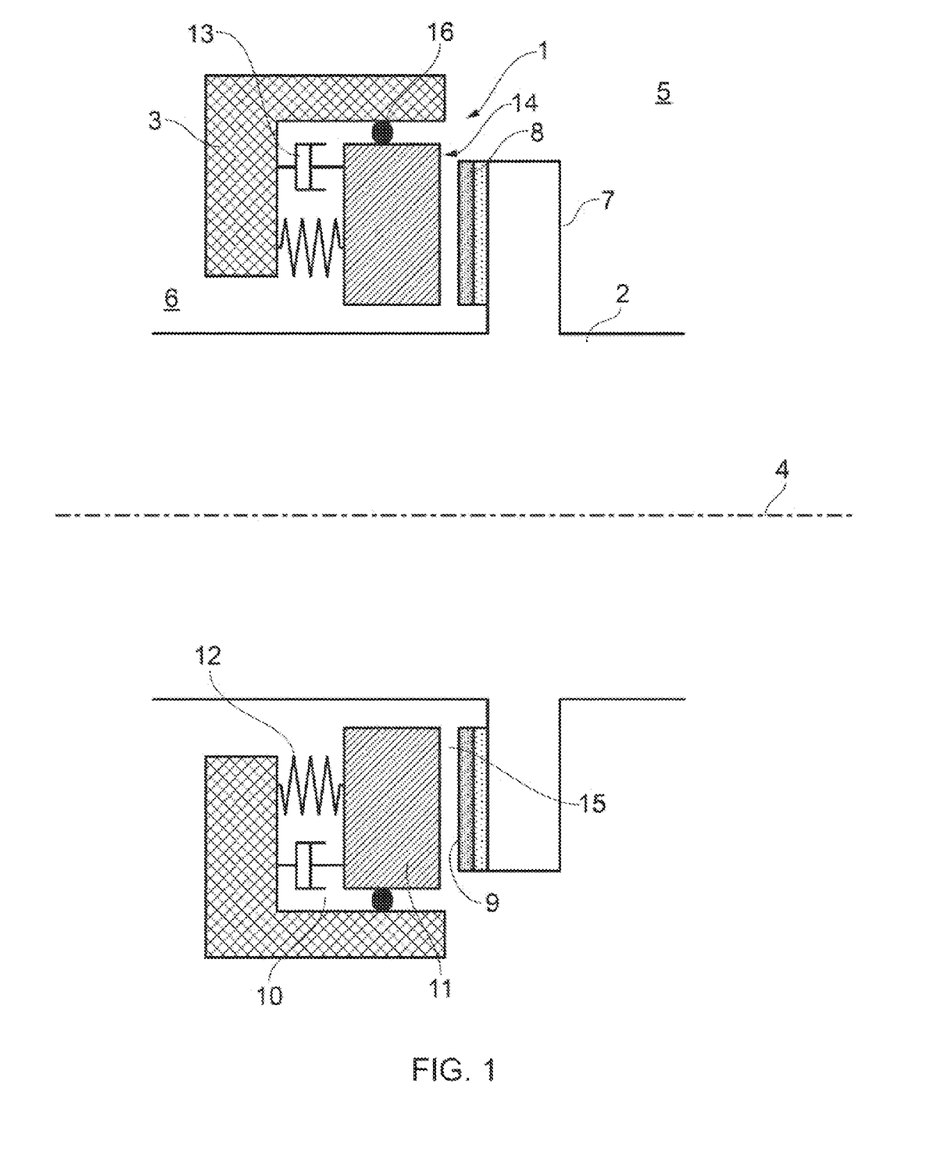
FIG. 1 is a transverse cross-sectional view taken through part of a rotor and associated stator, showing an air-riding seal in accordance with the present invention.

Referring now in more detail to FIG. 1, there is illustrated an air-riding seal arrangement 1 provided between a first structure 2 and an adjacent second structure 3. In the particular arrangement illustrated, the first structure 2 takes the form of a rotor mounted for rotation about an axis 4, and the second structure 3 takes the form of a stator which is fixed in position relative to the axis 4. The rotor 2 is thus rotatable relative to the stator 3 and may also move axially relative to the stator. The seal 1 is provided across a fluid leakage path which is defined between the rotor 2 and the stator 3 and which interconnects a first fluid chamber indicated generally at 5 and a second fluid chamber indicated generally at 6. The two chambers 5, 6 may contain liquids, gases and mixtures thereof at different pressures and the seal is thus provided in order to seal the leakage path, thereby minimizing the passage of fluid from the high pressure chamber to the low pressure chamber and preventing any leakage from the low pressure chamber to the high pressure chamber.

In the arrangement illustrated, the rotor 2 takes the form of an elongate shaft having an outwardly directed flange 7 which is arranged so as to be substantially orthogonal to the axis 4. The flange 7 may be formed as an integral part of the shaft, or may alternatively take the form of a separate seal rotor mounted to the shaft. The rotor 2 is provided with a first seal member 8 of annular form, the seal member being mounted to the flange 7 around the shaft (in a manner which will be described in more detail below) for rotation with the rotor 2 about the axis 4. The seal member 8 is preferably formed as a deformable sheet of metal, and defines a first seal surface 9 which presents towards the stator 3.

The stator 3 is shown in the form of an annular housing disposed around the shaft of the rotor and defines a recess 10 which accommodates a second seal member 11. The second seal member 11 takes the form of an annulus disposed around the shaft of the rotor 2, and is mounted to the stator 3 by a primary support arrangement for axial movement between the stator 3 and the flange 7 of the rotor 7. More particularly, the primary support arrangement comprises an annular array of spaced-apart compression springs 12 provided between the second seal member 11 and the stator such that the second seal member 11 is spring-mounted to the stator so as to be resiliently biased towards the first seal member 8. However, it should be appreciated that other biasing arrangements can be used as part of the primary support arrangement to bias the second seal member 11 towards the first seal member 8. The primary support arrangement in this embodiment also comprises an annular array of spaced-apart dampers 13 interconnecting the second seal member 11 and the stator 3. As will be appreciated, the dampers 13 act to damp any axial movement of the seal member 11 relative to the stator 3. An anti-rotation arrangement may be provided between the secondary seal member 11 and the stator 3 in order to prevent relative rotation between the seal member 11 and the stator 3. For example, it is envisage that a separate annular component (not shown) in the form of a thrust ring may be provided axially between the stator and the second seal member if necessary.

The second seal member 11 defines a substantially planar second seal surface 14 which is arranged in facing relation to the first seal surface 9 of the first seal member 8. The first seal member 8 is configured to generate a riding film of air between the facing seal surfaces 9, 14 upon rotation of the rotor 2, and as the first seal member 8 thus rotates relative to the second seal member 11. The second seat member 11 is thus urged away from the first seal member against the biasing force of the springs 12 and rides on the resulting film of air, so as to be spaced from the first seal member 8 by a small gap 15 as illustrated in FIG. 1. The rotating first seal member 8 can be configured in any of a number of convenient ways in order to generate the riding film of air. For example, it may be configured so as to have a surface relief pattern which could be formed by radially arranged grooves, Raleigh steps or the like.

As will be noted from FIG. 1, the second seal member 11 is significantly thicker in an axial sense than the first seal member 8. More particularly, the first and second seal members 8, 11 are configured such that the mass of the first seal member 8 is less than that of the second seal member 11. Also, in order to ensure that any wear arising from rubbing contact between the two seal members 8, 11 (e.g. during rotor start-up, slow speed operation or reverse operation when there is little or no lifting air film generated) occurs on the second seal member 11 (without the air-film generating features) rather than the first seal member 8 (provided with the air-film generating features), the second seal member is formed of a softer material than the first seal member 8. This is important in order to prevent wear damage of the air-film generating features on the first seal member 8. The preferred material for the second seal member 11 in order to provide these characteristics is carbon, although it is to be appreciated that any suitable material can be used providing it we preferentially compared to the material of the first seal member 8.

In order to prevent the leakage of fluid between the second seal member 11 and the stator 3, which would thus bypass the primary air-riding seal 1, a secondary seal 16 is provided between the second seal member 11 and the stator. In the particular arrangement illustrated in FIG. 1, the secondary seal 16 takes the form of a simple polymeric O-ring disposed between the seal member and the stator and in sealing contact with both. In order to retain the O-ring in this position it is proposed to seat the O-ring in a circumferential groove provided either on the stator 3 or the second seal member 11. The secondary seal 16 is configured to permit axial movement of the second seal member 11 relative to the stator. Alternative embodiments could use one of a number of different static seals to perform this secondary sealing function.

Figure 2:
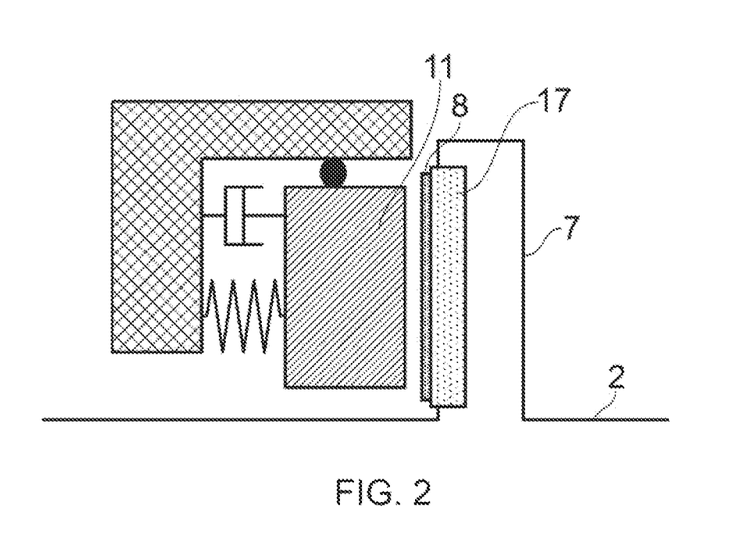
FIG. 2 is an enlarged view showing part of the rotor, stator and the seal in more detail.

The first seal member 8 is compliantly mounted to the rotor 2 via a secondary support arrangement in such a manner as to be able to yield relative to the rotor 2 in an axial sense, by virtue of its deformable nature. More particularly, FIG. 2 shows a secondary support arrangement in which the first seal member 8 is supported by an intermediate layer of elastically deformable material 17 provided between the seal member and the flange 7 of the rotor. The first seal member 8 is thus supported on the intermediate layer 17, and by virtue of the elastic nature of the layer 17 is effectively resiliently biased axially towards the second seal member 11.

Looking at FIG. 1, upon rotation of the rotor 2 relative to the stator 3, the first seal member 8 is caused to move at equal rotational speed relative to the second seal member 11. Providing this relative rotation occurs at sufficient speed, the air film-generating features on the face of the first seal member generate a lifting cushion of air which urges the second seal member 11 away from the first seal member 8. The second seal member 11 thus rides on the resulting cushion of air without contact with the first seal member 8. The lift-force generated by the air cushion reduces as the gap between the two seal members 8, 11 increases, and so the springs 12 of the primary support arrangement operate to urge the second seal member 11 back towards the first seal member, effectively balancing the lift-force.

The moveable connection provided by the springs 12 and the dampers 13 of the primary support arrangement between the second seal member 11 and the stator also serves to accommodate relatively low frequency large axial movements between the rotor 2 and the stator 3. However, because of the compliant manner in which the first seal member 8 is mounted to the rotor 2 by the secondary support arrangement, the air-riding seal 1 of the present invention is also able to accommodate relatively high frequency smaller axial excitations arising from imbalance of the rotor 2 or from localised "high-points" on the flange 7 of the rotor. The thin first seal member 8 is able to deflect by small distances in response to localised loadings during rotation, allowing the seal to tolerate high frequency excitations without exciting the second seal member 11. The second seal member 11, because of its large size and mass, and the fact that it is mounted on compliant springs 12 can be slow to respond to such excitations, leading to contact between the two seal faces 9 and 14. Such contact may damage the lift-generating features provided on the face of the first seal member and which are used to produce the air-riding effect. The air-riding seal 1 of the present invention is thus able to decouple such high frequency excitations caused by the rotor 2 from the sealing members 8, 11, whilst still permitting large, low frequency axial movements between the rotor 2 and the stator 3.

Figure 3:
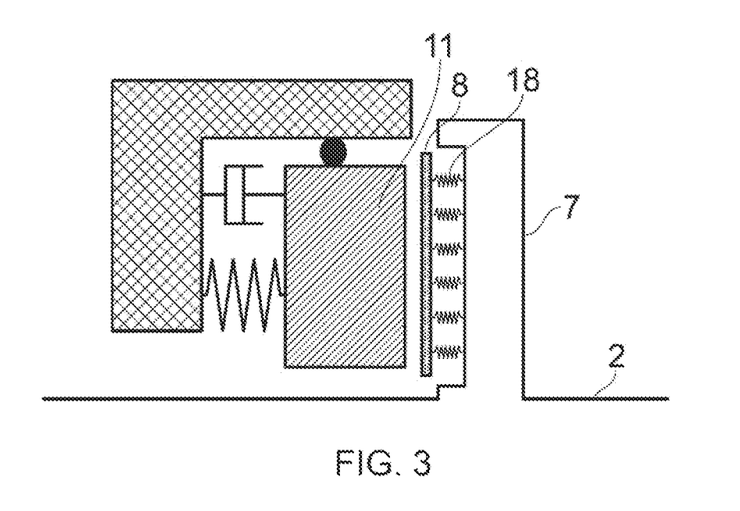
FIG. 3 is a view generally similar to that of FIG. 2 but showing a first alternative seal configuration.

Turning now to consider FIG. 3, there is illustrated an alternative secondary support arrangement for mounting the first seal member 8 to the rotor 2. In this arrangement, the layer of elastically deformable material 17 has been replaced by a plurality of compression springs 18 arranged between the first seal member 8 and the flange 7 of the rotor. The springs 18 are arranged in a regular array so as to apply a substantially uniform biasing force across the area of the seal member 8, the biasing force acting generally axially towards the second seal member 11. Alternatively, the springs 18 can be arranged in a structured array so as to apply a varying biasing force across the first seal member 8. In such an arrangement, it is proposed that the highest concentration of springs, and hence the region of highest biasing force, would correspond with the position where the maximum lift force is generated. It should be understood that the functionality provided by the compression springs could equally be performed by other mechanical arrangements configured to provide the required degree of compliance.

Figure 4:
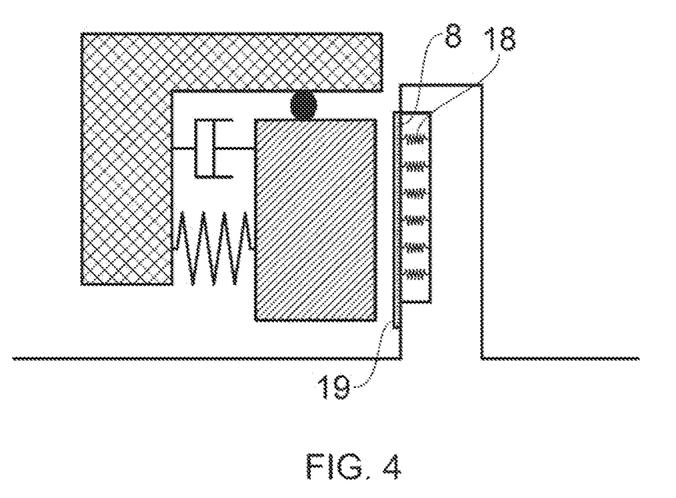
FIG. 4 is another similar view showing a second alternative seal configuration.
Figure 5:
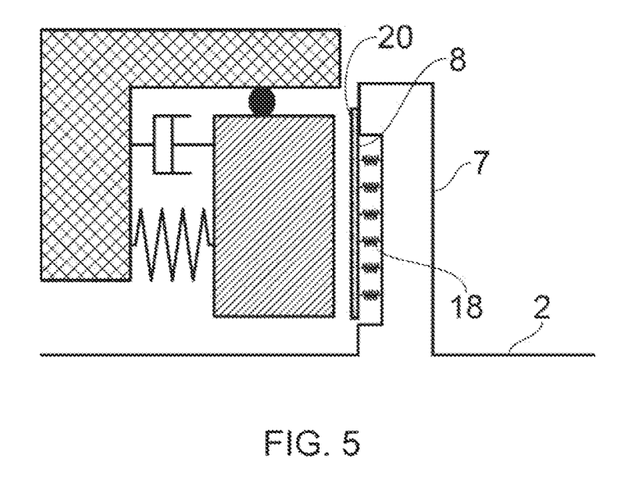
FIG. 5 is another similar view showing a third alternative seal configuration.

FIG. 4 shows another alternative secondary support arrangement, which effectively represents a modification of the arrangement shown in FIG. 3. In this arrangement the radially inner edge region 19 of the first seal member 8 is fixed to the flange 7 of the rotor 2. Alternatively, as illustrated in FIG. 5, the radially outer edge region 20 of the first seal member could be fixed to the flange of the rotor instead.

Figure 6:
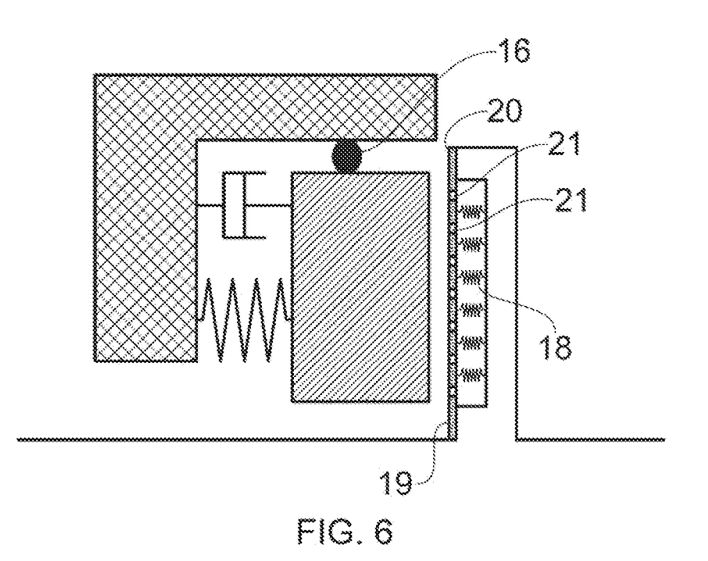
FIG. 6 is another similar view showing a fourth alternative seal configuration.

FIG. 6 shows yet another alternative secondary support arrangement for mounting the first seal member 8 to the rotor 2. In this arrangement, both the radially inner and outer edge regions 19, 20 of the first seal member are fixed to the rotor 2. In order to improve the deflection characteristics of this arrangement, the first seal member 8 can be provided with a series of apertures which can, for example, be used to contribute to the air-film generating characteristics of the seal member 8. These apertures also assist in allowing pressure equalisation across the first seal member 8, and may be provided in the form of circular holes.

Figure 7:
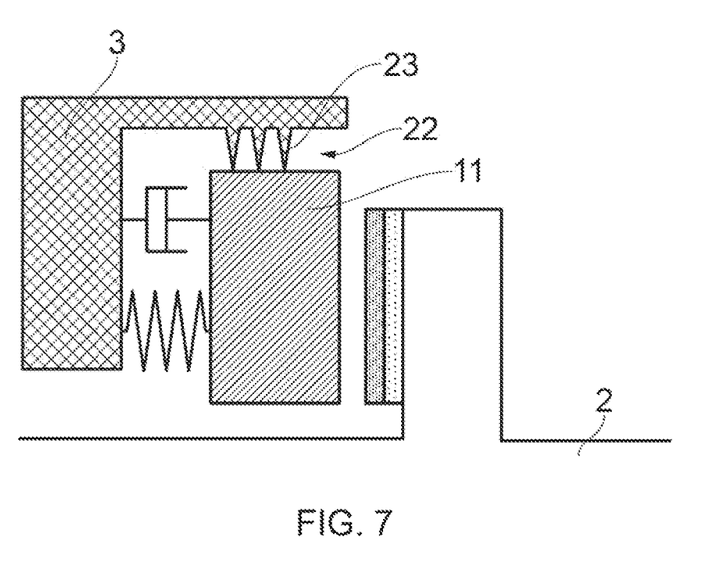
FIG. 7 is another similar view showing a fifth alternative seal configuration.

Whilst each of the embodiments described above are illustrated with a secondary seal 16 in the form of a simple O-ring between the second seal member 11 and the stator 3, it is to be appreciated that other convenient forms of secondary seal can be used instead. For example, FIG. 7 illustrates an arrangement in which the O-ring 16 has been replaced with a labyrinth seal 22 which comprises a series of axially adjacent fins 23 carried by the stator 3 and which extend radially inwardly towards the seal member 11. However, it should be appreciated that the fins 23 could alternatively be provided on the second seal member, so as to extend radially outwards towards the stator 3.

Figure 8:
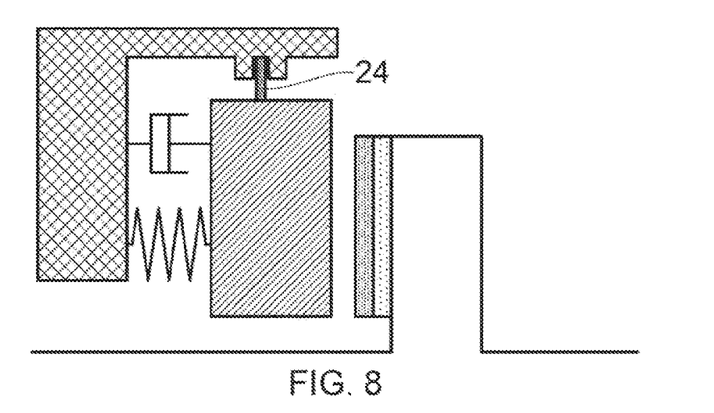
FIG. 8 is another similar view showing a sixth alternative seal configuration.

FIG. 8 shows another alternative form of secondary seal, in which there is provided carbon ring 24 which is fixed to the stator 3 and which extends radially inwardly towards the seal member 11. Alternatively, the carbon ring 24 can be fixed to the second seal member 11 and arranged so as to extend radially outwardly towards the stator 3.

Figure 9:
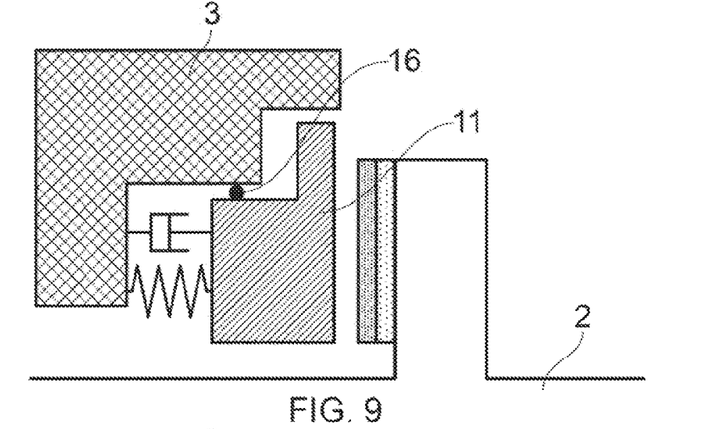
FIG. 9 is another similar view showing a seventh alternative seal configuration.
Figure 10:
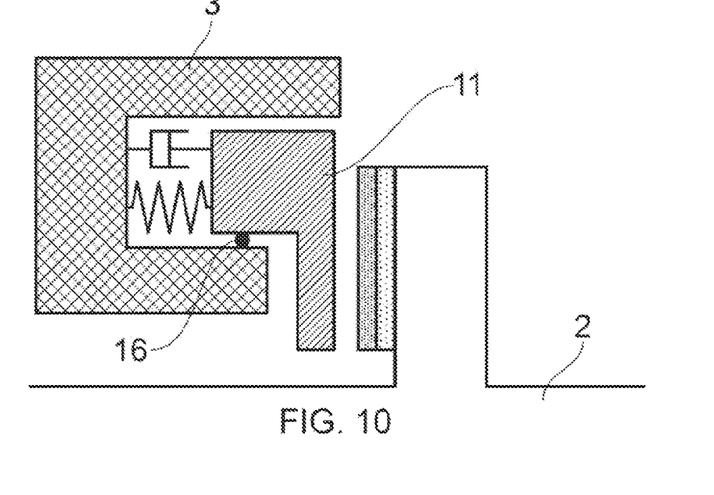
FIG. 10 is another similar view showing an eighth alternative seal configuration.

FIGS. 9 and 10 both show alternative forms of stator 3 and associated second seal members 11 which use a secondary seal 16 of O-ring form, the secondary seal being provided at different radial positions. However, it is to be noted that these O-ring secondary seals could be replaced by any of the other types mentioned above. In each of the alternative secondary seal arrangements illustrated in FIGS. 7 to 10, it is to be noted that the secondary seal is configured to permit relative axial movement between the stator 3 and the second seal member 11. Likewise, the shape of the second seal member 11 is selected to permit axial movement between the seal member 11 and the stator 3 over a range which is larger than the range of anticipated axial movement of the rotor 2.

Turning now to consider FIGS. 11 and 12, alternative seal configurations will be described in which the first seal member is actually formed integrally with the first structure 2 so as to be substantially immovable relative to the first structure in an axial sense.

Figure 11:
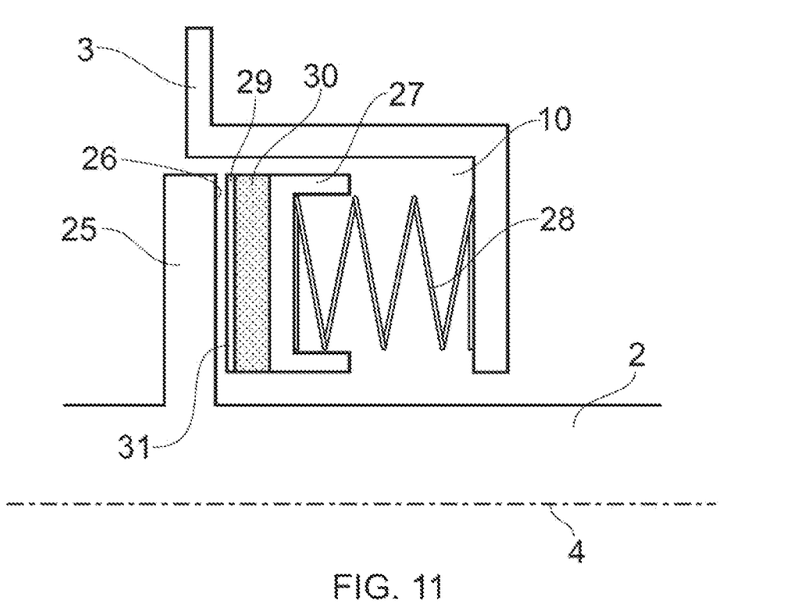
FIG. 11 is another similar view showing a ninth alternative seal configuration.

In arrangement shown in FIG. 11 the first structure 2 again takes the form of a rotor mounted for rotation about an axis 4, and the second structure 3 again takes the form of a stator which is fixed in position relative to the axis 4. Furthermore, the rotor 2 again takes the form of an elongate shaft having an outwardly directed flange 25 which is preferably arranged so as to be as close to orthogonal to the axis 4 as possible. In this arrangement the flange 25 effectively forms the first seal member of the seal arrangement, the first seal member again being of annular form for rotation with the rest of the rotor 2 about the axis 4. The first seal member 25 defined by the flange defines a generally planar first seal surface 26 which presents towards the stator 3.

The stator 3 is again shown in the form of an annular housing disposed around the shaft of the rotor 2 and defines a similar recess 10. The recess 10 accommodates a thrust ring the form of an annulus disposed around the shaft of the rotor 2 and which is mounted to the stator 3 by a primary support arrangement for axial movement between the stator 3 and the first seal member 27 defined by the flange of the rotor 2. More particularly, the primary support arrangement in this embodiment comprises an annular array of spaced-apart compression springs 28 provided between the thrust ring 27 and the stator 3 such that the thrust ring 27 is spring-mounted to the stator 3 so as to be resiliently biased towards the first seal member 25. However, it should be appreciated that once again other biasing arrangements can be used instead to bias the thrust ring 27 towards the first seal member 25. Furthermore, although not illustrated, this embodiment may also comprise an annular array of dampers interconnecting the thrust ring 27 and the stator 3 in a similar manner to the previous embodiments which have dampers interconnecting their second seal member 11 and the stator 3.

In this embodiment, the second seal member 29 is compliantly mounted to the thrust ring 27 via a secondary support arrangement comprising an intermediate layer of elastically deformable material 30 provided between the second seal member 29 and the thrust ring 27. The second seal member 29 is thus supported on the intermediate layer 30, and by virtue of the elastic nature of the layer 30 is effectively resiliently biased axially away from the thrust ring 27 and towards the first seal member 25. Furthermore, the second seal member 29 is preferably formed as thin, lightweight compliant metal foil, and this has a mass considerably less than the mass of the thrust ring 27. The second seal member 29 defines a generally planar second seal surface 31 which presents towards the first seal member 25 and is spaced therefrom by an axial gap.

It will be noted that in this arrangement the second seal member 29 is thus effectively mounted to the stator 3 by both the primary support arrangement (comprising the springs 28) and the secondary support arrangement (comprising the intermediate layer 27). The primary and secondary support arrangements are thus effectively arranged in series and both are associated with the second seal member 29. This is in contrast to the previously-described embodiments in which the primary and secondary support arrangements are associated with respective seal members.

Figure 12:
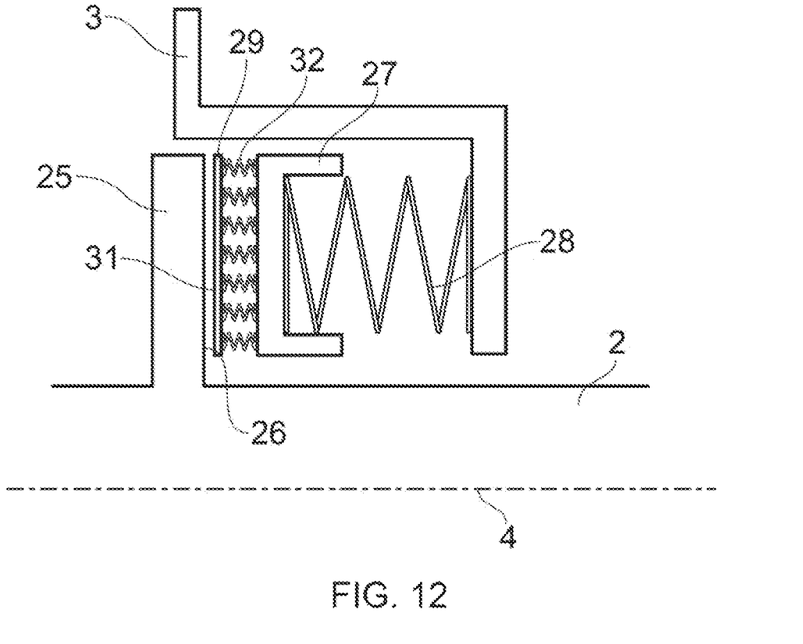
FIG. 12 is another similar view showing a tenth alternative seal configuration in the form a modification to the arrangement shown in FIG. 11.

In the alternative seal arrangement illustrated in FIG. 12, the intermediate layer of deformable material 30 supporting the second seal member 29 has been replaced by a plurality of compression springs 32 arranged between the second seal member 29 and the thrust ring 27. The springs may arranged in a regular array so as to apply a substantially uniform biasing force across the area of the seal member 29, the biasing force acting generally axially towards the first seal member 25. Alternatively, the springs 32 can be arranged in a structured array as illustrated so as to apply a varying biasing force across the second seal member 29. In such an arrangement, it is proposed that the highest concentration of springs, and hence the region of highest biasing force, would correspond with the position where the maximum lift force is generated. In the arrangement illustrated, the springs are more concentrated in the region radially closest to the axis of rotation 4.

The arrangements of FIGS. 11 and 12 are intended to operate in a generally similar manner to one another as will now be described.

In ideal conditions, the seals will operate in a similar manner to an otherwise conventional air-riding carbon seal, such that the spring force and axial pressure force pushing on the right hand side (as illustrated) of the thrust ring 27 is balanced by the pressure and lift force generated in the lift generating gap between the two facing seal surfaces 26, 31. In this situation the sole purpose of the compliant layer 30, or the springs 32 is to transfer the axial load from the thrust ring 27 to the second seal member 29.

Figure 13:
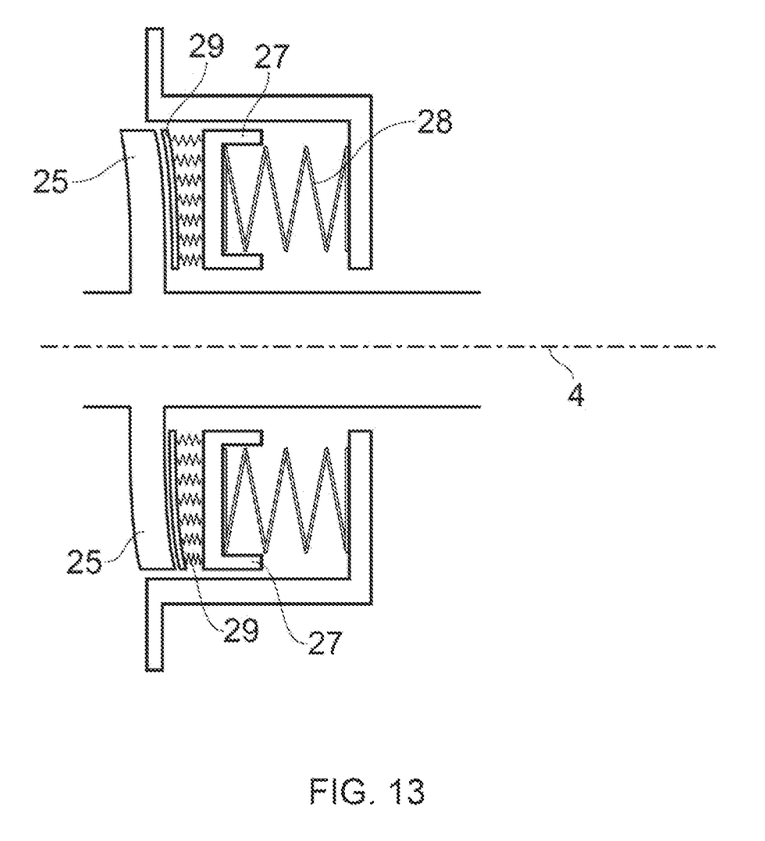
FIG. 13 is a cross-sectional view taken through a seal arrangement in accordance with the embodiment of FIG. 12, showing the seal in operation in an arrangement having manufacturing tolerances.

However, under more typical conditions, the flange defining the first seal member 25 on the rotor 2 may not be mounted perfectly perpendicular to the axis 4 of the shaft. This can arise, for example, from manufacturing tolerances. FIG. 13 shows an example of this, where the flange defining the first seal member 25 is mounted to or formed integrally with the shaft of the rotor 2 with a degree of swash. The resulting effect is that as the rotor 2 rotates, the first seal member 25 acts like a awash plate. In this situation, if the seal arrangement did not have its second seal member 29 mounted compliantly, either by the complaint layer 30 or the springs 32 of the secondary support arrangement, then the entire thrust ring 27 would need to follow the swashing motion to retain a good seal between the seal surfaces 26, 31. Because the mass of the thrust ring 27 and the springs 28 of its associated primary support arrangement are considerable, the resulting forces required to move the thrust ring 27 are high. Furthermore, the primary springs can begin to resonate under certain circumstances. Consequently, a seal arrangement without the compliant mounting of the second seal member 29 provided by the secondary support arrangement of the invention can only provide an effective seal between the rotating seal surfaces 26, 31 with very small amplitudes of swath.

As will thus be appreciated, the principle benefit of the seal arrangements of ach of the above-described embodiments of the present invention, is that the secondary support arrangement can accommodate small-amplitude, high-frequency axial movements of the sealing surfaces 26, 31 (for example as can arise from the mash effect shown in FIG. 13), while the primary support arrangement can accommodate large-amplitude but less frequent axial movements (such as those which can occur in a gas turbine engine at start-up, or as a result of large changes in throttle position).

In each of the above-described arrangements, the primary support arrangement a associated seal member or thrust member can be considered to function as a first mass-spring system, and the secondary support arrangement and its associated seal member can be considered to function as a second mass-spring system. The two mass-spring systems are thus tuned differently to one another and can operate independently of one another, regardless of whether they are mounted to respective structures 2, 3 (as in the case of the embodiments shown in FIGS. 1 to 10), or whether they are mounted "in series" on the same structure (as in the case of the embodiments shown in FIGS. 11 to 13). Furthermore, it is to be noted that whilst the invention has been described above with reference to specific embodiments in which a first structure is provided in the form of a rotor 2 arranged for rotation relative to a second structure provided in the form of a stator 3, this sort of configuration is not essential. For example, it is envisaged that the air riding seal of the present invention could instead be provided between first and second structures configured and arranged such that both are rotatable about a common axis, either in the same direction as one another (e.g. at different speeds) or in opposite directions to one another. Alternatively, the air riding seal could be provided between first and second structures arranged such that the first structure is provided in the form of a stator and the second structure is provided in the form of a rotor arranged to rotate relative to the first structure.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A rotary air-riding seal between a first structure and an adjacent second structure, at least one of said structures being rotatable relative to the other about an axis of rotation, the seal comprising:
    first and second seal members defining respective seal surfaces in facing relation to one another, the first seal member being provided on the first structure and the second seal member being mounted to the second structure by a primary support arrangement configured to permit axial oscillation of the second seal member and to resiliently bias the second seal member towards the first seal member,
    wherein at least one of said seal members is configured to generate a riding film of air between said seal surfaces,
    wherein the first seal member is supported for axial oscillation relative to the second seal member by a secondary support arrangement configured to bias said first seal member towards said second seal member, and
    wherein said support arrangements are configured such that: said primary support arrangement accommodates relatively low frequency axial movements between said seal members; and said secondary support arrangement accommodates relatively high frequency axial movements between said seal members.

2. An air-riding seal according to claim 1, wherein the primary support arrangement is configured to bias the second seal member towards the first seal member with a primary biasing force, and the secondary support arrangement is configured to bias the first seal member towards the second seal member with a secondary biasing force, the secondary biasing force being less than the primary biasing force.

3. An air-riding seal according to claim 1, wherein said support arrangements each comprise or form part of a mass-spring system.

4. An air-riding seal according to claim 1, wherein the first seal member is mounted to said first structure by said secondary support arrangement for axial oscillation relative to said first structure and said second seal member.

5. An air-riding seal according to claim 1, further comprising at least one damper between the second seal member and the second structure.

6. An air-riding seal according to claim 1, wherein the first seal member is formed of softer material than the second seal member.

7. An air-riding seal according to claim 6, wherein said softer material is carbon.

8. An air-riding seal according to claim 1, wherein the second seal member is in the form of a deformable sheet of metal.

9. A rotary air-riding seal between a first structure and an adjacent second structure, at least one of said structures being rotatable relative to the other about an axis of rotation, the seal comprising:
first and second seal members defining respective seal surfaces in facing relation to one another, the first seal member being provided on the first structure and the second seal member being mounted to the second structure by a primary support arrangement configured to permit axial oscillation of the second seal member and to resiliently bias the second seal member towards the first seal member,
wherein at least one of said seal members is configured to generate a riding film of air between said seal surfaces,
wherein one of said seal members is supported for axial oscillation relative to the other seal member by a secondary support arrangement configured to bias said one seal member towards said other seal member, the secondary support arrangement extending radially along the majority of an axial face of said one seal member, and
wherein said support arrangements are configured such that: said primary support arrangement accommodates relatively low frequency axial movements between said seal members; and said secondary support arrangement accommodates relatively high frequency axial movements between said seal members.

* * * * *